United States Patent
Ucar et al.

(10) Patent No.: US 11,323,858 B2
(45) Date of Patent: May 3, 2022

(54) POSITION DELEGATION FOR IMPROVED VEHICULAR CLOUD OPERATION

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 185 days.

(21) Appl. No.: 16/823,821

(22) Filed: Mar. 19, 2020

(65) Prior Publication Data

US 2021/0297827 A1   Sep. 23, 2021

(51) Int. Cl.
| | |
|---|---|
| *H04W 4/40* | (2018.01) |
| *G05D 1/00* | (2006.01) |
| *H04W 24/02* | (2009.01) |
| *H04W 24/08* | (2009.01) |
| *H04W 16/18* | (2009.01) |

(52) U.S. Cl.
CPC ............ *H04W 4/40* (2018.02); *G05D 1/0088* (2013.01); *H04W 16/18* (2013.01); *H04W 24/02* (2013.01); *H04W 24/08* (2013.01)

(58) Field of Classification Search
CPC ....... H04W 4/40; H04W 16/18; H04W 24/02; H04W 24/08; H04W 64/00; H04L 67/12; G05D 1/0088
See application file for complete search history.

(56) References Cited

U.S. PATENT DOCUMENTS

| | | | |
|---|---|---|---|
| 9,799,224 B2 | 10/2017 | Okamoto | |
| 9,940,840 B1 | 4/2018 | Schubert et al. | |
| 10,459,444 B1* | 10/2019 | Kentley-Klay | ...... G05D 1/0027 |
| 10,473,793 B2 | 11/2019 | Neubecker et al. | |
| 2010/0256852 A1 | 10/2010 | Mudalige | |
| 2019/0014446 A1* | 1/2019 | Gade | ...................... G08G 1/164 |
| 2019/0191265 A1 | 6/2019 | Altintas et al. | |
| 2020/0005633 A1* | 1/2020 | Jin | ...................... H04L 63/1441 |
| 2020/0074862 A1* | 3/2020 | Johnston | .............. G05D 1/0088 |
| 2020/0092596 A1* | 3/2020 | Moore, Jr | ............... H04L 67/18 |
| 2020/0126404 A1* | 4/2020 | Edwards | .............. G08G 1/0112 |
| 2020/0133288 A1* | 4/2020 | Abari | .................... G05D 1/0231 |

* cited by examiner

*Primary Examiner* — Hassan Kizou
*Assistant Examiner* — Hector Reyes
(74) *Attorney, Agent, or Firm* — Christopher G. Darrow; Darrow Mustafa PC

(57) ABSTRACT

System, methods, and embodiments described herein relate to controlling a vehicular micro cloud, which may include a plurality of vehicle members each having respective positions in a formation and in which two or more of the vehicle members collaboratively execute at least one micro cloud operation. Control may be implemented to monitor performance of the at least one micro cloud operation, monitor operational capabilities of the vehicle members, determine, based at least in part on the operational capabilities of the vehicle members, a change in formation position for at least one of the vehicle members, wherein the change in formation position improves the performance of the at least one micro cloud operation and transmit one or more commands to cause the vehicle members to execute the change in formation position.

20 Claims, 6 Drawing Sheets

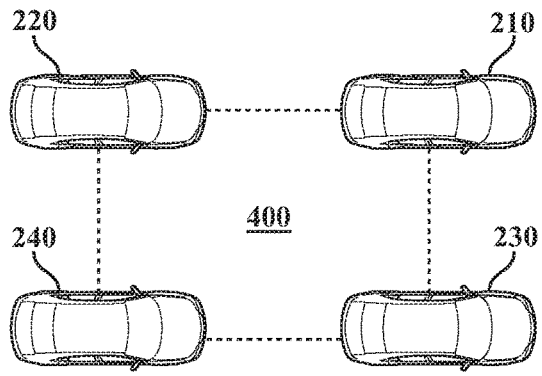
FIG. 4A
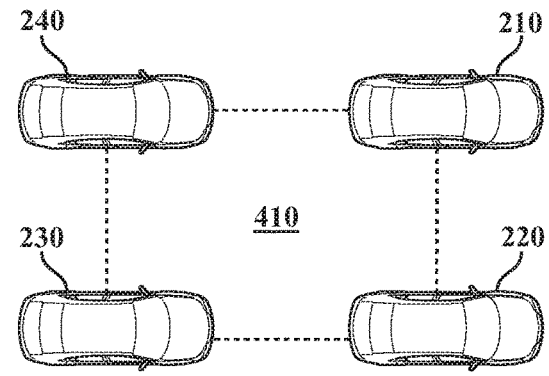
FIG. 4B
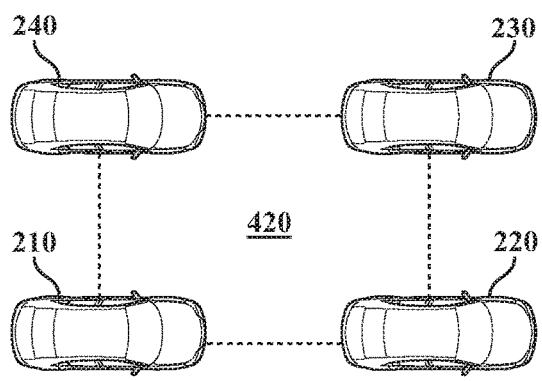
FIG. 4C
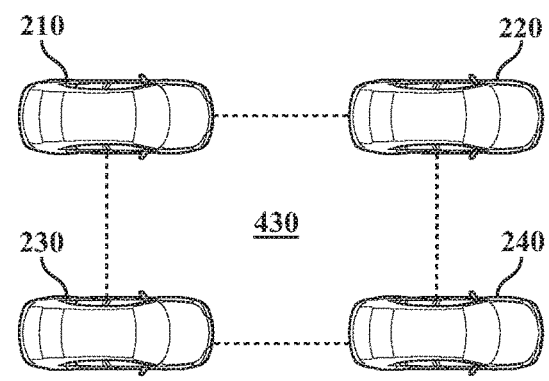
FIG. 4D
| Formation | Score |
|---|---|
| 400 | 89 |
| 410 | 91 |
| 420 | 75 |
| 430 | 81 |
FIG. 5

POSITION DELEGATION FOR IMPROVED VEHICULAR CLOUD OPERATION

TECHNICAL FIELD

The subject matter described herein relates, in general, to a system and method for controlling a vehicular micro cloud, and, more particularly, to determining and executing position delegation in the vehicular micro cloud to improve performance of micro cloud operations.

BACKGROUND

Two or more vehicles can establish communications connections to form a cluster of interconnected vehicles (e.g., via vehicle-to-everything, i.e., "V2X") that are located within a common vicinity. Such clusters are known as "vehicular micro clouds" or simply "micro clouds." Vehicle members in a micro cloud (i.e., "members") can have varying types of computing resources and capabilities, for example, depending on the model/make of the vehicle. Members in a micro cloud can share their computing resources with other members of the micro cloud to collaborate on operational tasks, such as, for example, environmental sensing, data processing and data storage.

SUMMARY

The disclosed devices, systems and methods relate to controlling a vehicular micro cloud to improve performance of the micro cloud execution of a collaborative micro cloud operation.

In one embodiment, a system includes a communication system for controlling a vehicular micro cloud including a plurality of vehicle members each having respective positions in a formation, and in which two or more of the vehicle members collaboratively execute at least one micro cloud operation. The system can include a communication system configured to transmit/receive communications between the system and the vehicle members, one or more processors, and a memory communicably coupled to the one or more processors. The memory can store a performance module including instructions that when executed by the one or more processors cause the one or more processors to monitor performance of the at least one micro cloud operation.

The memory can also store a resource module including instructions that when executed by the one or more processors cause the one or more processors to monitor operational capabilities of the vehicle members.

In addition, the memory can store a position module including instructions that when executed by the one or more processors cause the one or more processors to determine, based at least in part on the operational capabilities of the vehicle members, a change in formation position for at least one of the vehicle members and transmit one or more commands to cause the vehicle members to execute the change in formation position. The change in formation position improves the performance of the at least one micro cloud operation.

In another embodiment, a method for controlling a vehicular micro cloud including a plurality of vehicle members each having respective positions in a formation, and in which two or more of the vehicle members collaboratively execute at least one micro cloud operation, includes monitoring performance of the at least one micro cloud operation, and monitoring operational capabilities of the vehicle members.

The method further includes determining, based at least in part on the operational capabilities of the vehicle members, a change in formation position for at least one of the vehicle members, wherein the change in formation position improves the performance of the at least one micro cloud operation, and transmitting one or more commands to cause the vehicle members to execute the change in formation position.

In still another embodiment, a non-transitory computer-readable medium for controlling a vehicular micro cloud including a plurality of vehicle members each having respective positions in a formation, and in which two or more of the vehicle members collaboratively execute at least one micro cloud operation, including instructions that, when executed by one or more processors, cause the one or more processors to monitor performance of the at least one micro cloud operation and monitor operational capabilities of the vehicle members.

The instructions further cause the one or more processors to determine, based at least in part on the operational capabilities of the vehicle members, a change in formation position for at least one of the vehicle members, wherein the change in formation position improves the performance of the at least one micro cloud operation and transmit one or more commands to cause the vehicle members to execute the change in formation position.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 4A-4D illustrate example potential formations according to the disclosed embodiments.

FIG. 5 illustrates a table of example formation scores according to the disclosed embodiments.

DETAILED DESCRIPTION

Figure 1:
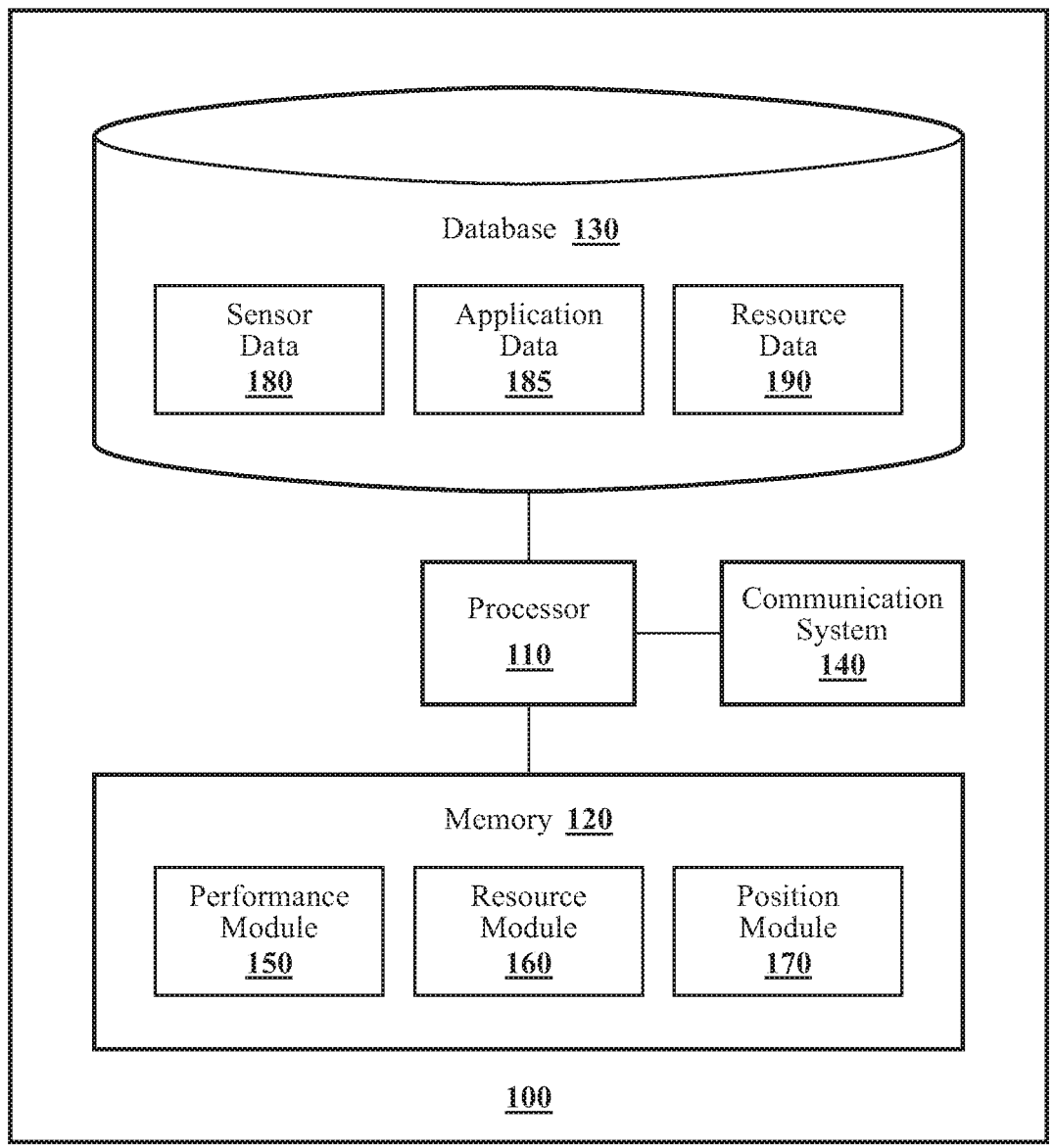
FIG. 1 illustrates one embodiment of a micro cloud control system according to the disclosed embodiments.

Systems, methods, and other embodiments associated with controlling a vehicular micro cloud to improve execution of a micro cloud operation are disclosed. Herein, a "micro cloud operation" refers to a task (e.g., a computational task, sensing task, network task, etc.) performed in the micro cloud environment and that two or more connected vehicles or members in a micro cloud contribute to completing. As previously mentioned, vehicle members in a vehicular micro cloud can have and share varying types of computing resources and capabilities. For example, a first vehicle in a micro cloud may be equipped with low quality front-facing sensors while in contrast a second vehicle in the same micro cloud may be equipped with high quality front-facing sensors. As another example, a first vehicle may include a relatively low amount of data storage capacity while a second vehicle may include a relatively high amount of data storage capacity. As such, one of the advantages of forming a vehicular micro cloud is providing the members with access to potentially higher quality or more powerful computing/sensing resources via the micro cloud network.

Generally, a vehicular micro cloud can travel in a defined formation. Herein, "formation" refers to a specific positional arrangement that two or more vehicles maintain while traveling together as part of the same vehicular micro cloud. In a conventional micro cloud, the general pattern of a formation is consistent over extended periods of travel with certain limited exceptions, such as changes that occur when members exit/enter the micro cloud. However, the physical positions of the vehicle members relative to each other can have a significant impact on how efficiently micro cloud members can collaboratively execute micro cloud operations.

Therefore, a vehicular micro cloud control system and associated methods are disclosed herein that provides an approach to improve a micro cloud operation by adjusting the micro cloud formation in ways that positively affect the performance of the micro cloud operation. In one or more embodiments, the disclosed vehicular micro cloud control system can monitor the performance and/or progress of the micro cloud operation, monitor operational capabilities and/or component states of the members of the vehicular micro cloud, and determine, based at least in part on the operational capabilities and/or component states, a formation that will improve the performance of the micro cloud execution of the micro cloud operation. For example, the disclosed system can determine a change in formation position for a member of the vehicular micro cloud such that the new position improves one or more of the speed, accuracy, range, quality, etc., of the performance of the micro cloud operation. Upon determining the improved formation the disclosed system can transmit one or more commands to cause the members to execute the change in position and thereby improve the performance of the micro cloud operation and the functionality of the micro cloud itself.

Referring to FIG. 1, one example embodiment of a vehicular micro cloud control system 100 is illustrated. The vehicular micro cloud control system 100 can be implemented, for example, as a central server, a cloud server, an edge serve, a vehicle member of the micro cloud, a cloud-based computing device or other network-connected computing device that can communicate with one or more external devices, or a cluster of connected devices (e.g., road-side units, stationary vehicles, etc.). The vehicular micro cloud control system 100 is shown including a processor 110, a memory 120, database 130, and a communication system 140. In other embodiments more or fewer components than those shown can be included according to an implementation of the disclosed subject matter.

In one or more embodiments, the processor 110 may be a part of the vehicular micro cloud control system 100, or the vehicular micro cloud control system 100 may access the processor 110 through a network communication. The processor 110 may be one or more processors according the processing power required per implementation.

The memory 120 can be implemented as a random-access memory (RAM), read-only memory (ROM), a hard-disk drive, a flash memory, or other suitable memory for storing, among other things, a performance module 150, a resource module 160 and a position module 170. The modules 150, 160 and 170 will be described further below.

The database 130 can store, among other information, sensor data 180, application data 185 and resource data 190, which will be also described further below. The database 130 is, in one or more embodiments, an electronic data structure that can be a data store integral with the vehicular micro cloud control system 100, a removable memory device that can be installed in or removed from the vehicular micro cloud control system 100, or another network-based data store that is accessible to modules 150, 160 and 170 stored in the memory 120. In one or more embodiments the database 130 can be accessible to external systems, such as cloud or edge servers, micro cloud members, or road-side units. The database 130 is configured with routines that can be executed by the processor 110 for analyzing stored data, accessing and providing stored data, organizing stored data, and so on. Thus, in one embodiment, the database 130 stores and manages/updates data, such as sensor data 180, application data 185 and resource data 190, as well as other types of data that is used by modules 150, 160 and 170 in executing various functions.

The communication system 140 can be implemented implemented, for example, as a wireless communication system including one or more transmitting/receiving devices, one or more transmitting/receiving antennas and a controller for transmitting and receiving data over a wireless network using any of a variety of protocols, such as vehicle-to-vehicle (V2V), vehicle-to-everything (V2X), general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The communication system 140 can also include vehicle-to-cloud, vehicle-to-datacenter and any type of V2X communication protocol. In one or more embodiments, the communication system 140 can be configured to receive, for example, sensor data 180, application data 185 and resource data 190 from one or more reporting entities, such as various members of the micro cloud.

The modules 150, 160 and 170 can be, for example, constructed as computer-readable instructions that when executed by the processor 110 cause the processor 110 to perform the various functions disclosed herein.

The performance module 150 generally includes instructions that function to control the processor 110 to monitor performance of execution of at least one micro cloud operation and/or multiple operations simultaneously being performed within the micro cloud environment. In one or more embodiments, the micro cloud operation(s) can include one or more of performing a shared computational task among multiple micro cloud members, storing or updating data contents among micro cloud members, perform sensing of road conditions by on-board sensors of multiple vehicles among the micro cloud members, transmitting data between an external system and micro cloud members, or other types of operations.

In one or more embodiments, the performance module 150 can keep statistics (e.g., completion time, error log, accuracy of the completed tasks, customized quality metrics, etc.) of the operation(s) performed within the micro cloud environment. In one or more embodiments, the performance module 150 can generate a performance score for a micro cloud operation currently in execution and similarly generate a predicted performance score for a pending micro cloud operation. The performance module 150 can generate the predicted performance score based on inputs including resource data indicating available resources among the micro cloud members and member formation positions, as discussed further below. The parameters for determining the performance score may vary depending on the micro cloud operation being evaluated.

In one or more embodiments, the performance module 150 can include one or more predefined rules for evaluating performance of a micro cloud operation. For example, in one implementation the predefined rules may include preference for optimizing a specific parameter for a given micro cloud operation, or in a given context. In one or more embodiments, the performance module 150 can include a machine and/or deep learning algorithm configured to learn an evaluation technique for evaluating performance of a micro cloud operation.

The resource module 160 generally includes instructions that function to control the processor 110 to monitor operational capabilities of the plurality of vehicles. In one or more embodiments, the operational capabilities can include one or more of data storage capacity, computational power, sensor availability/capability, network communication capability, available applications, and type/shape/surface of a vehicle. In one or more embodiments, the resource module 160 can record and maintain a history log of resource utilization as part of resource data 190 for one or more members of the micro cloud and, based at least in part on information from the history log, predict upcoming availability of resources. For example, in one implementation the resource module 160 can identify a pattern of use (e.g., processor use in a given micro cloud member declines at stops) for a particular micro cloud resource and based on the pattern of use predict upcoming availability of the resource.

In one or more embodiments, the resource module 160 can determine one or more resource ratings that indicate evaluations of operational capabilities of resources present in micro cloud members. For example, the resource module 160 can rate a first sensor of a first member of the micro cloud with a '6' rating and rate a second sensor of a second member of the micro cloud with an '8' rating, indicating that the second sensor exhibits superior capability compared to the first sensor. The resource ratings can be based on the historical data, look up tables for known components, or other types of evaluation.

The position module 170 generally includes instructions that function to control the processor 110 to monitor the current position and destination information of micro cloud members, determine, based at least in part on the operational capabilities of the plurality of vehicles, a change in formation position for a first vehicle of the plurality of vehicles relative to a second vehicle of the plurality of vehicles, and transmit one or more commands to cause the plurality of vehicles to execute the change in position. As discussed below, the change in position improves the performance of at least one micro cloud operation executed by members of the vehicular micro cloud.

In one or more embodiments, the position module 170 can determine the change in position by using a heuristic approach, such as generating one or more potential formations, obtaining performance scores for the potential formations from the performance module 150, and selecting a formation from among the potential formations that results in an improved or highest performance score. The one or more potential formations can be randomly generated, generated based on predicted upcoming resources, generated based on historical data, or generated based on another basis. In one or more embodiments, the position module 170 can determine the change in position using a machine learning algorithm, for example, a neural network trained to identify situations, circumstances or patterns that indicate resolvable inefficiencies with known cures, as will be discussed further below.

In one or more embodiments, the position module 170 can determine a new formation through application of predetermined rules (e.g., if-then-else-statement, iterative loop, etc.) or learn to generate a new formation based on previous performance results.

In one or more embodiments, the position module 170 can access sensor data 180 obtained from one or more sensors of one or more members of the micro cloud to identify contextual and/or environmental factors as additional inputs for the heuristic approach or machine learning algorithm. In one or more embodiments, the position module 170 can access supplemental information (e.g., traffic reports, weather reports, accident reports, etc.) from one or more external sources as additional inputs for the heuristic approach or machine learning algorithm.

Figures 2, 3:
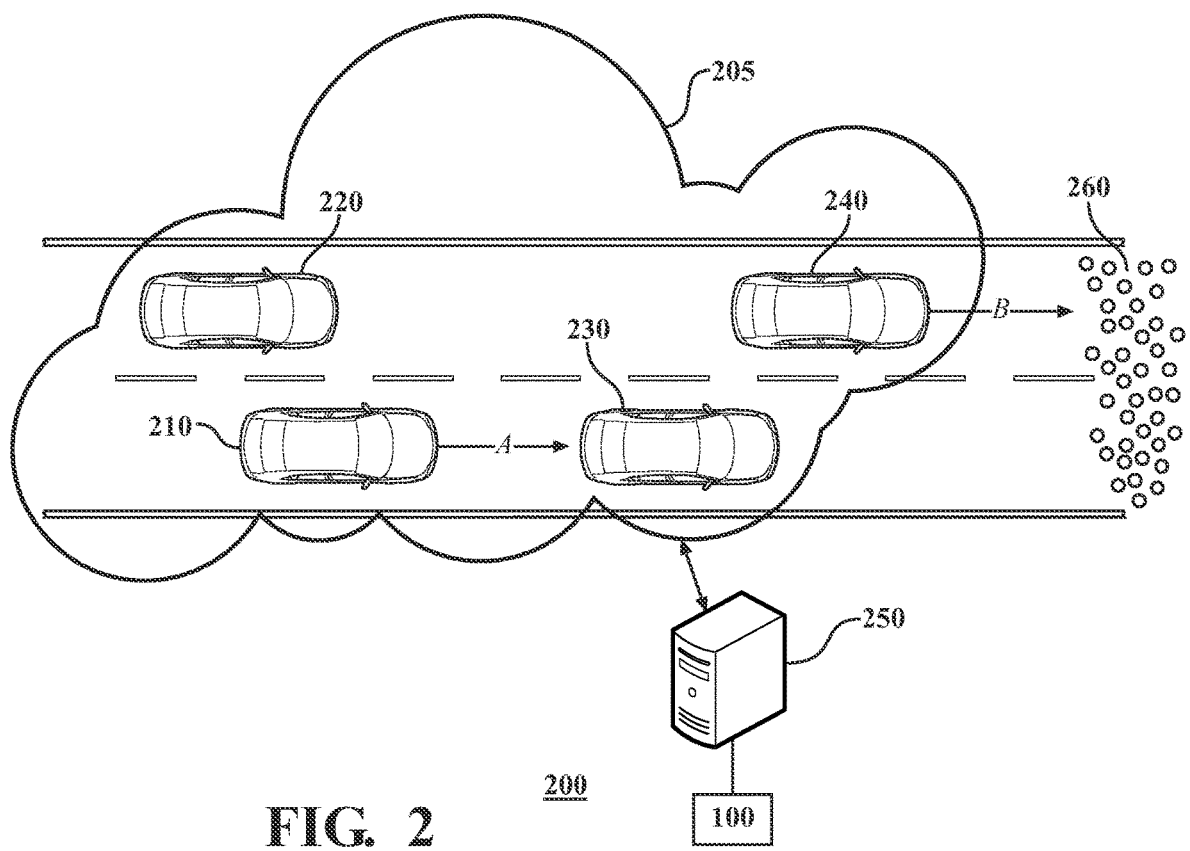
FIG. 2 illustrates an example scene in which the disclosed micro cloud control system may be applied according to the disclosed embodiments.
FIG. 3 illustrates an example database table of resource data according to the disclosed embodiments.

FIG. 2 shows an example scene 200 in which the disclosed embodiments may be applied. In the example scene 200, a micro cloud 205 includes four vehicle members 210-240 traveling in a side-by-side formation. Vehicle members 210 and 220 are assigned to the rear position, vehicle members 230 and 240 are assigned to the front positions.

The micro cloud 205 is in communication with an edge server 250 that is implementing, among other things, the disclosed vehicular micro cloud control system 100. For example, in addition to the disclosed system 100, the server 250 can include other systems related to micro cloud control, such as a routing system (not shown) that determines routes for the micro cloud, and a micro cloud manager (not shown) the manages micro cloud maneuvers such as initial creation, member entrance and exit, and dissolution of the micro cloud, etc. Although the system 100 is shown implemented in an edge server 250, it should be understood that the system 100 can be implemented differently in different embodiments. For example, in other embodiments the system 100 can be implemented in a vehicle member of the micro cloud (e.g., a leader or coordinator vehicle), in a cloud server, in one or more roadside units or stationary vehicles, etc.

In the formation shown, vehicle member 210 is in a formation position having a forward view A that is obstructed by vehicle member 230. Due to the formation positioning, the obstruction will essentially be present as long as the micro cloud 205 maintains the formation. On the other hand, vehicle member 240 is in position having a forward view B that is not obstructed by any other micro cloud members.

As the micro cloud 205 travels, members can collaboratively perform micro cloud operations, that is, carry out tasks that multiple members contribute resources toward for completion. A micro cloud operation can be executed primarily to aid a single member (e.g., downloading and processing data, such as a video) or primarily to aid multiple members, ranging from two members to the entire micro cloud. For example, during a segment of travel the micro cloud 205 may perform an environmental scanning operation or object detection operation that obtains sensor data from vehicle members that are at the front of the formation and processes the sensor data to map the environment for the micro cloud or detect potential obstacles for the micro cloud. The tasks of obtaining sensor data and data processing for environment mapping or object detection can technically be performed by any of the vehicle members 210-240. However, the formation positions of the vehicle members 210-240 can impact the efficiency of resource utilization by the micro cloud, as a whole, in performing the tasks.

The performance module 150 can therefore monitor performance of the micro cloud operation as it is executed by the micro cloud 205. Herein, the phrase "executed by the micro cloud" refers to two or more members collaboratively executing an operation. In one or more embodiments, the performance module 150 can generate a score, based on metrics associated with the micro cloud operation, that indicates a level of performance of the micro cloud operation. For example, while monitoring the environment detection operation, the performance module 150 can generate a score based on a range of sensor data obtained, quality of sensor data obtained, speed of processing the data for object detection, etc.

The precise formula the performance module 150 uses for generating the score can vary per implementation and per monitored operation. In one or more embodiments, the formula may be customized and/or predetermined per operation. In one or more embodiments the formula may be created and/or adjusted by the performance module 150 dynamically as each micro cloud operation is initiated and executed. For purposes of illustration the performance module 150 can determine a performance score S for the example environment detection operation according to the formula:

$$S=(w1)R+(w2)Q+(w3)D \qquad \text{Eq. 1}$$

where R is the maximum range of the operation relative to the micro cloud 205, Q is a rating of the quality (i.e., resolution, lack of noise, etc.) of the sensor data used in the operation, D is the speed at which the operation detects objects within the sensor data, and w1, w2, and w3 are adjustable weight values.

As previously mentioned, the resource module 160 can record resource data 190 that indicates the available resources of each of vehicle members 210-240. In one or more embodiments the resource module 160 can record the resource data 190 in a database table format stored in database 130. FIG. 3 shows an example of a database table 300 of resource data 190 recorded by the resource module 160. It should be understood that the database table 300 is merely an example provided for illustrative purposes to better facilitate understanding of the disclosed embodiments. Implementations of the disclosed subject matter can include different monitored resource types and values, as well as various vehicle attributes such as model, shape, etc., and vehicle components/features, such as fog lights, all-wheel-drive, etc.

In one or more embodiments, the database table 300 can include multiple columns for recording various types of data associated with a vehicle member identifier (ID) 310 associated with a member of the micro cloud. The columns can include, for example, download speed 320, upload speed 330, front-facing sensor range 340, rear-facing sensor range 350, processing speed 360, and storage capacity 370. Correlating FIGS. 2 and 3, each vehicle member ID 310 corresponds with a vehicle member of the micro cloud 205, e.g., ID 1145 corresponds with vehicle member 210, ID 1151 corresponds with vehicle member 220, and so on as shown.

In one or more embodiments, the resource module 160 can dynamically update the resource data 190 of database table 300 as the micro cloud 205 travels, for example, to indicate entry/departure of vehicle members or changes in operation capacity of vehicle members. As such, the resource data 190 can reflect events such as a front sensor of a vehicle member malfunctioning, a processor of a vehicle member slowing down under a heavy load, storage capacity of a vehicle member being depleted, etc. In one or more embodiments, the resource module 160 can periodically timestamp and record the database table 300 values into a history log as part of the resource data 190 to maintain a history of past resource availability.

The position module 170 can determine, based at least in part on the operational capabilities of the vehicle members 210-240, e.g., as indicated by the resource data 190, a change in the formation of the micro cloud 205 to improve the performance of a micro cloud operation. For example, in one or more embodiments the position module 170 can generate a plurality of potential formations, simulate execution of the micro cloud operation in each potential formation, obtain a performance score from the performance module 150 for each potential formation, and select a potential formation that results in an improved performance score. The change in formation results in at least one vehicle member changing its formation position relative to another vehicle member. The change in formation can also result in a new shape of the formation (e.g., shifting to all in-line as opposed to side-by-side) as well as changed positions. The position module 170 can transmit commands to the vehicle members to cause the vehicle members to execute the change in position.

Referring to FIGS. 4A-4D, the position module 170 can generate a plurality of unique potential formations 400-430. Although four potential formations are illustrated it should be understood that this number is merely an example for illustrative purposes. The position module 170 can generate any number of potential formations having any number of different shapes according to the implementation and number of vehicle members in the micro cloud. The position module 170 can generate the potential formations randomly, for example. In the example shown, for each of the formations 400-430 the position module 170 can simulate execution of a current or upcoming micro cloud operation. In one or more embodiments the simulation can receive resource data 190 as input, thereby modeling the execution of the micro cloud operation by the current micro cloud members.

The simulation results can be processed by the performance module 150 to produce a performance score. When the micro cloud members have varying operational capabilities, the performance scores for the potential formations will vary accordingly.

For example, referring to FIGS. 5 and 3, FIG. 5 shows a table 500 of example formation scores for formations 410-430 simulating a micro cloud operation, e.g., an environmental scanning operation. Vehicles members 210 and 220 have greater front sensor range (100 m and 75 m, respectively) than vehicle members 230 and 240 (50 m and 10 m, respectively). Accordingly, the formation 410 (as shown in FIG. 4B), which moves vehicle members 210 and 220 to front positions and will result in the highest performance score (91) for the environmental scanning operation. Thus, the position module 170 can determine that the score of 91 is higher than the score for the original formation shown in FIG. 2 and select formation 410 as the new formation for the micro cloud to assume to improve performance of the micro cloud operation.

As an alternative or supplemental method, in one or more embodiments the position module 170 can include a machine learning algorithm trained to identify designated situations that may have characteristics that cause particular formations or positions of the vehicle members to provide advantageous performance. The situations may, for example, be related to specific environment conditions (weather, traffic, etc.), times (day, night, etc.), or other contextual situations that the micro cloud may encounter during a trip. Training data can include sensor data collected in instances of the designated situations. An appropriate, predetermined formation strategy can be associated with each designated situation.

For example, referring to FIG. 2, in one or more implementations the position module 170 can identify, e.g., based on analysis of sensor data 180 (which may be further confirmed by, for example, a report obtained from an external server) that the micro cloud 205 is approaching a foggy area 260. The position module 170 can include a machine learning algorithm trained to recognize the foggy environment as a designated situation to which a predetermined formation strategy is applicable. In this example, according to the predetermined strategy, the position module 170 can generate potential formations that includes vehicle members having fog lights in front positions of the micro cloud 205 to improve performance of the environmental scanning operation.

Thus, generally, the position module 170 can include instructions to obtain contextual information that indicates characteristics of the environment in the vicinity of the micro cloud 205, identify a designated situation based at least in part on the contextual information, the designated situation having an associated predetermined formation strategy, and generate one or more potential formations in accordance with the predetermined formation strategy.

In any case, when the position module 170 selects a new formation (e.g., based on performance scores and/or based on contextual selection), the position module 170 can transmit commands to the vehicle members 210-240 to cause them to change positions and assume the new formation, thereby improving the performance of the micro cloud operation.

Although the above-discussed example relates to improving environmental scanning or object detection operations, the disclosed subject matter is not limited to these types of operations. The disclosed subject matter is applicable to any micro cloud operations that can involve multiple vehicle member contributions of resources and can be impacted by formation position, including but not limited to performing a shared computational task among multiple vehicle members, storing or updating data contents among multiple vehicle members and transmitting data between an external system and multiple vehicle members. For example, in a micro cloud including fifteen members traveling in an in-line formation, a micro cloud operation of downloading and processing content can be impacted by the formation position of a first vehicle member having a greatest network downloading capability and a second vehicle member requesting the download. The speed of completion of the task and the overall utilization of micro cloud resources can be impacted by the positions of the first and second vehicles relative to each other in the formation.

Figure 6:
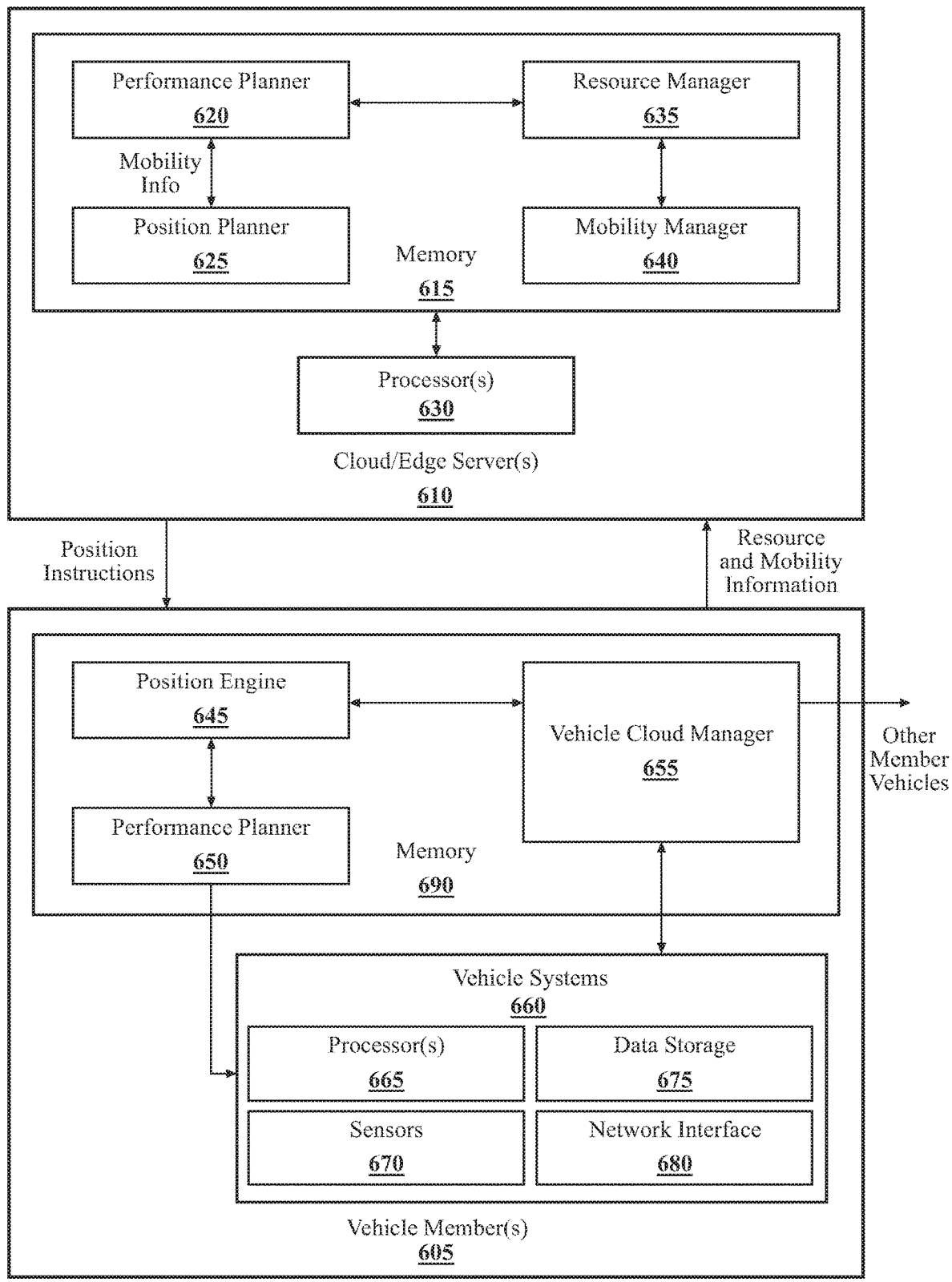
FIG. 6 illustrates a distributed architecture embodiment of a micro cloud control system according to the disclosed embodiments.

FIG. 6 shows a distributed architecture embodiment of a micro cloud control system 600 according to the disclosed embodiments. The vehicular micro cloud control system 600 can be implemented distributed across one or more vehicle members 605 of a micro cloud and one or more cloud/edge servers 610 in communication with the micro cloud members.

In one or more embodiments the server cloud/edge 610 can include a memory 615 and one or more processors 630. The memory 615 can be implemented as a random-access memory (RAM), read-only memory (ROM), a hard-disk drive, a flash memory, or other suitable memory for storing, among other things, a performance planner module 620, a position planner module 625, a resource manager module 635, and a mobility manager module 640. As will be discussed below, additional performance planner modules 650 can be stored distributed on each vehicle member 605 as well.

The performance planner module 620 generally includes instructions that function to control the processor(s) 630 to track statistics (e.g., completion time, accuracy of completed tasks, error logs, etc.) of micro cloud operations.

The position planner module 625 generally includes instructions that function to control the processor(s) 630 to monitor current position and destination information of vehicle members 605 of the micro cloud.

The resource manager module 635 generally includes instructions that function to control the processor(s) 630 to obtain data indicating resource capabilities of vehicle members of the micro cloud and monitor resource utilization of the vehicle members. Resource capabilities can include but are not limited to sensors, storage, network and computing speed, as well as vehicle type, shape and surface traits. The resource manager module 635 can further include instructions to record a history of resource utilization by vehicle members 605 of the micro cloud. The resource manager module 635 can also include instructions and/or algorithms configured to track current availability of resources among the vehicle members and predict the upcoming availability of resources among the vehicle members.

The mobility manager module 640 generally includes instructions that function to control the processor(s) 630 to obtain mobility information associated with vehicle members of the micro cloud. In one or more embodiments, mobility information can include absolute coordinate or relative positions of vehicle members within the micro cloud.

On the vehicle side, the vehicle member 605 (which may be viewed as representative of one or more members of the micro cloud) includes vehicle systems 660 including, but not limited to, processor(s) 665, sensors 670, data storage 675 and network interface 680. The vehicle member 605 can also include a memory 690 in communication with the vehicle systems 660. The memory 690 can be implemented as a random-access memory (RAM), read-only memory (ROM), a hard-disk drive, a flash memory, or other suitable memory for storing, among other things, a position engine module 645, a performance planner module 650 and a vehicle cloud manager module 655.

The vehicle cloud manager module 655 generally includes instructions that function to control the processor(s) 630 to coordinate with other vehicle members of the micro cloud. For example, the vehicle cloud manager module 655 includes instructions configured to maintain intra-micro cloud wireless links, control resource utilization and collaborative task execution, share geo-location information of the micro cloud with the mobility manager module 640, and share resource information of the micro cloud with the resource manager module 635.

The position engine module 645 generally includes instructions that function to control the processor(s) 630 to process received position delegations. The position engine module 645 can include instructions to perform the position delegations in coordination with the vehicle cloud manager module 655 and to report an updated position (i.e., mobility information) of the vehicle member 605 to the mobility manager module 640.

In operation, in one or more embodiments the position planner module 625 can generate alternative formations and position delegations that may improve the performance of a micro cloud operation. In one or more embodiments, the position planner module 625 can employ, for example, the heuristic approach or the contextual situation approach as discussed above for generating new formations, or another technique.

The performance planner module 620 can include instructions and/or algorithms configured to predict expected performance of a micro cloud operation based at least in part on information from the position planner module 625 (e.g., alternative formations) and resource manager module 635 (e.g., resource availability and utilization information). For example, in one or more embodiments the performance planner module 620 can simulate execution of the micro cloud operation in alternative formations and determine a performance result based at least in part on the resource availability and utilization information.

Thus, the performance planner module 620 may coordinate with the resource manager module 635 and position planner module 625 to determine a new formation for vehicle members that improves performance of a micro cloud operation (or, as will be discussed further below, multiple micro cloud operations). In one or more embodiments, the new formation results in a new arrangement of vehicle members in which at least one vehicle member has a changed formation position relative to another vehicle member (e.g., referring to FIGS. 4A and 4B, changing from formation 400 to formation 410).

The position planner module 625 may include instructions to transmit position delegations to the position engine module 645 of the vehicle member(s) 605 to cause the position engine module 645 to perform the position delegation, i.e., move the vehicle member(s) 605 into the position(s) required for the micro cloud to assume a new formation.

Although the above-discussed examples are provided in the context of improving a single micro cloud operation, the disclosed embodiments are not limited to this implementation. The disclosed embodiments may improve multiple micro cloud operations simultaneously or sequentially. For example, in one or more embodiments, the vehicular micro cloud control system 100 (or 600) can determine a formation that simultaneously improves multiple micro cloud operations, or improves a plurality of micro cloud operations such that the overall performance of currently executing micro cloud operations improves. In one or more embodiments the vehicular micro cloud control system 100 (or 600) can prioritize improving micro cloud operations according to estimated completion time.

Figure 7:
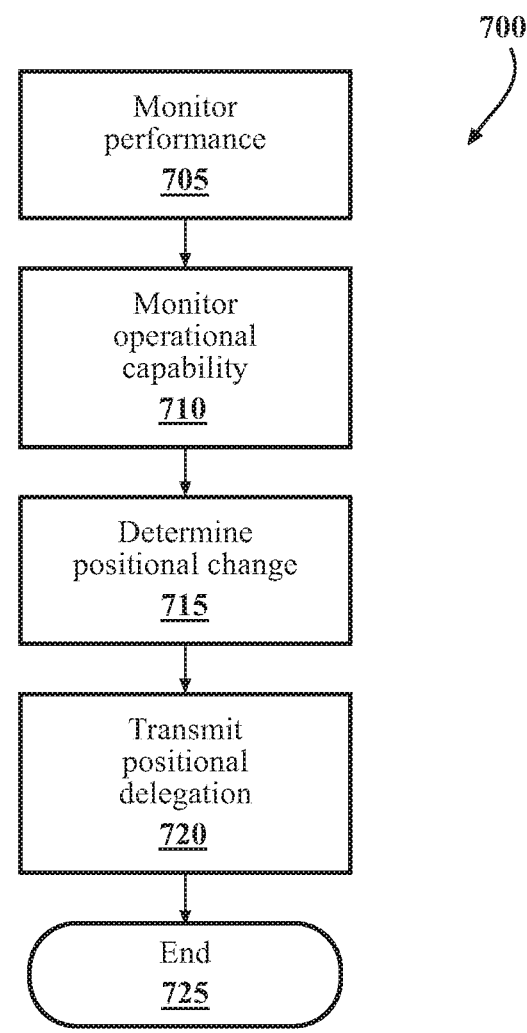
FIG. 7 illustrates a flowchart of a method of controlling a vehicular micro cloud to adjust a formation to improve performance of a micro cloud operation according to the disclosed embodiments.

FIG. 7 illustrates a flowchart of a method 700 of controlling a vehicular micro cloud to adjust a formation to improve performance of a micro cloud operation according to the disclosed embodiments. The method 700 can be implemented to control a plurality of vehicles that form at least a part of a vehicular micro cloud in which the plurality of vehicles each have respective positions and collaboratively execute at least one micro cloud operation according to the disclosed embodiments. Method 700 will be discussed from the perspective of the vehicular micro cloud control system 100 of FIG. 1. While method 700 is discussed in combination with the vehicular micro cloud control system 100, it should be understood that the method 700 is not limited to implementation within the vehicular micro cloud control system 100, which is merely one example of a system that may implement the method 700. It should further be understood that the order of operations can change in various implementations of the method 700.

At operation 705 the vehicular micro cloud control system 100 (e.g., performance module 150) monitors performance of execution of the at least one micro cloud operation by the vehicular micro cloud. The monitored performance metrics can include, for example, speed of execution, accuracy of results, number of errors, and other types of performance indicators.

At operation 710 the vehicular micro cloud control system 100 (e.g., resource module 160) monitors operational capabilities of the vehicle members of the micro cloud. The operational capabilities can include, for example, storage capacity, processor/network speed, sensor characteristics (e.g., range, type, quality, resolution, etc.), vehicle attributes (e.g., shape, surface, type, special features, such as fog lights, all-wheel-drive, etc.), autonomous functionality, etc. In one or more embodiments the resource module 160 can record a history of operational capability use and availability per vehicle member.

At operation 715 the vehicular micro cloud control system 100 (e.g., position module 170) determines, based at least in part on the operational capabilities of the vehicle members, a change in position for a first vehicle of the plurality of vehicles relative to a second vehicle of the plurality of vehicles, wherein the change in position improves the performance of execution of the at least one micro cloud operation by the vehicular micro cloud.

At operation 720 the position module 170 transmits one or more commands to cause the plurality of vehicles to execute the change in position. The method ends at 725 and can thereafter be periodically re-executed beginning at operation 705.

Figure 8:
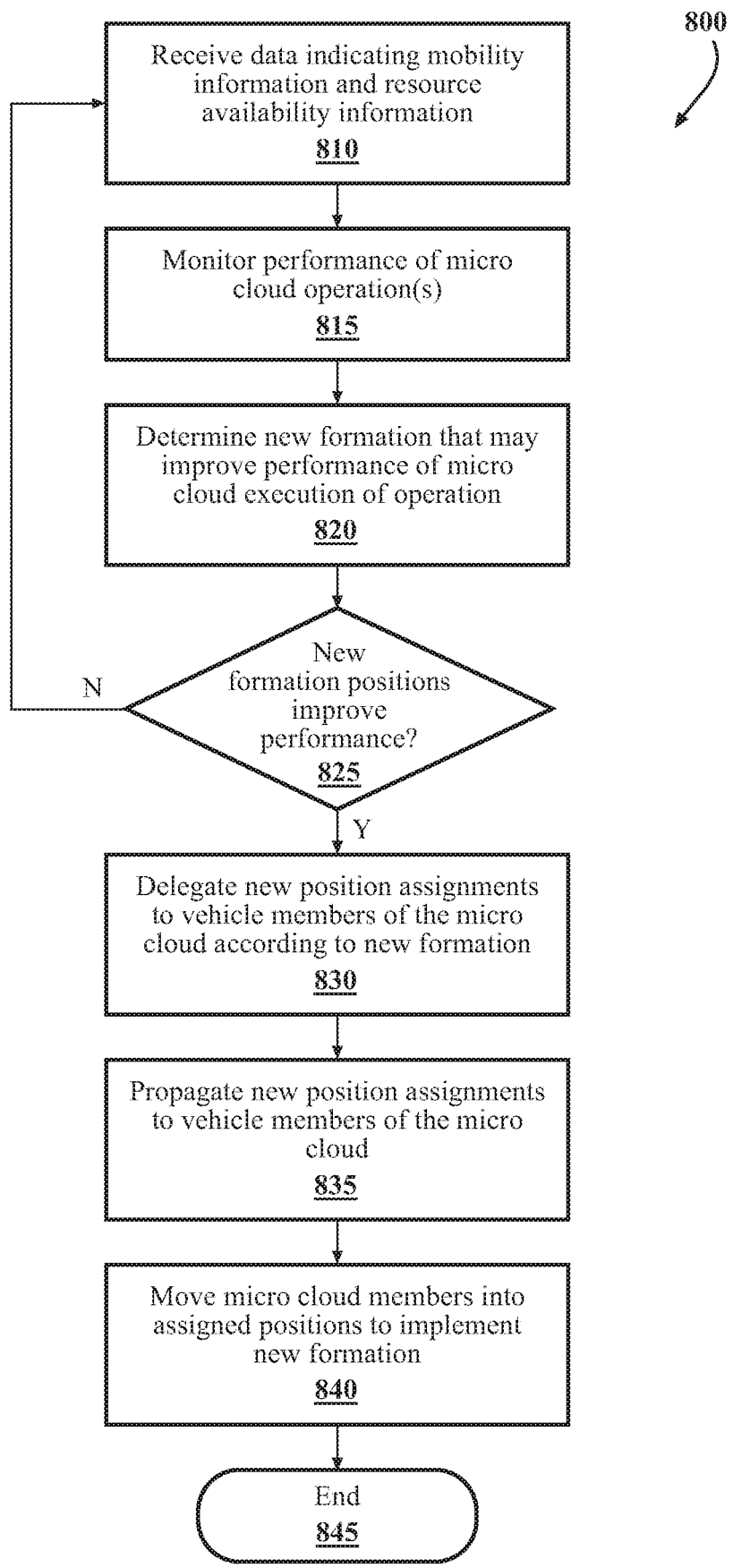
FIG. 8 illustrates a flowchart of another method of controlling a vehicular micro cloud to adjust a formation to improve performance of a micro cloud operation according to the disclosed embodiments.

FIG. 8 illustrates a flowchart of a method 800 of controlling a vehicular micro cloud to change a formation of the micro cloud to improve performance of a micro cloud operation according to the disclosed embodiments. Method 800 will be discussed from the perspective of the distributed vehicular micro cloud control system 600 of FIG. 6. While method 800 is discussed in combination with the vehicular micro cloud control system 600, it should be understood that the method 800 is not limited to implementation within the vehicular micro cloud control system 600, which is merely one example of a system that may implement the method 800. It should further be understood that the order of operations can change in various implementations of the method 800.

At operation 810 the vehicular micro cloud control system 600 (e.g., mobility manager module 640 and resource manager module 635) receives data indicating mobility information and resource availability information. The mobility information can include absolute coordinate or relative positions of vehicle members within the micro cloud. The resource availability information can indicate utilization/availability of resources including, but not limited to, storage, network and computing speed, vehicle type, shape and surface traits of the vehicle.

At operation 815 the vehicular micro cloud control system 600 (e.g., performance planner module 620 and performance planner module 650) monitors performance of a micro cloud operation being executed by the micro cloud. Monitoring the performance can include tracking statistics (e.g., completion time, accuracy of completed tasks, error log, quality metrics, etc.) related to the micro cloud operation.

At operation 820 the vehicular micro cloud control system 600 (e.g., position planner module 625) determines one or more new formations for the micro cloud vehicle members. The new formation(s) results in new placement arrangement of the vehicle members. In one or more embodiments, the new formation(s) results in at least one vehicle member having a different position relative to another vehicle member as compared to the current formation.

At operation 825 the vehicular micro cloud control system 600 (e.g., performance planner module 620) determines, based at least in part on the mobility information and the resource availability information, whether a new formation, from among the one or more new formations, improves performance of the micro cloud operation. In one or more embodiments, improving performance can include improving one or more of speed, accuracy, quality, results, range or effect of the micro cloud operation. In one or more embodiments, improving performance can include improving a specific metric based on the micro cloud operation. When none of the one or more formations improves performance of the micro cloud operation, then the method continues at operation 810.

When a new formation is determined to improve the micro cloud operation, at operation 830 the vehicular micro cloud control system 600 (e.g., position planner module 625) delegates new position assignments to one or more vehicle members according to the new formation. For example, a vehicle member that was previously assigned to a rear position may be assigned to a front position.

At operation 835 the vehicular micro cloud control system 600 (e.g., position planner module 625) propagates the new position assignments to the vehicle members of the micro cloud. In one or more embodiments, the new position assignments are received by the position engine module 645 and the vehicle cloud manager module 655.

At operation 840 the position engine module 645 moves the micro cloud vehicle into the assigned position, thereby implementing the new formation and improving performance of the micro cloud operation. The process ends at 845 and thereafter may periodically re-execute beginning at operation 810.

Thus, the disclosed vehicular micro cloud control system 100 can continually monitor for opportunities to improve performance of one or more micro cloud operations. The disclosed vehicular micro cloud control system 100 can search for and determine new formations for a vehicular micro cloud that improve utilization of available resources and improve execution of micro cloud operations.

As discussed above, the vehicular micro cloud control system 100 can include one or more modules, at least some of which are described herein. The modules can be implemented as computer-readable program code that, when executed by a processor 110 (and/or processor 630, 665), implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores of the vehicular micro cloud control system (e.g., database 130) may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, 4A-4D, and 5-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling a vehicular micro cloud including a plurality of vehicle members each having respective positions in a formation, and in which two or more of the vehicle members collaboratively execute at least one micro cloud operation, comprising:
   a communication system configured to transmit/receive communications between the system and the vehicle members;
   one or more processors; and
   a memory communicably coupled to the one or more processors and storing:
   a performance module including instructions that when executed by the one or more processors cause the one or more processors to monitor performance of the at least one micro cloud operation;
   a resource module including instructions that when executed by the one or more processors cause the one or more processors to monitor operational capabilities of the vehicle members; and
   a position module including instructions that when executed by the one or more processors cause the one or more processors to determine, based at least in part on the operational capabilities of the vehicle members, a change in formation position for at least one of the vehicle members and to transmit one or more commands to cause the vehicle members to execute the change in formation position,
   wherein the change in formation position improves the performance of the at least one micro cloud operation.

2. The system of claim 1, wherein the at least one micro cloud operation includes one of more of:
   environmental scanning and/or object detection,
   performing a shared computational task among multiple ones of the vehicle members,
   storing or updating data contents among the multiple ones of the vehicle members, or
   transmitting data between an external system and the multiple ones of the vehicle members.

3. The system of claim 1, wherein the operational capabilities include one or more of:
   data storage capacity,
   computational power,
   sensor capability,
   network communication capability, or
   available applications.

4. The system of claim 1, wherein the position module includes instructions that cause the one or more processors to determine the change in formation position by:
   generating one or more potential formations;
   determining that a new formation, from among the one or more potential formations, improves the performance of the at least one micro cloud operation; and determining the change in formation position according to the new formation.

5. The system of claim 4, wherein the position module includes instructions that cause the one or more processors to determine that the new formation, from the one or more potential formations, improves the performance of the at least one micro cloud operation by:
   determining a first performance score for the at least one micro cloud operation in a current formation;
   simulating an execution of the at least one micro cloud operation in the new formation;
   determining a second performance score for the at least one micro cloud operation based on the execution; and
   determining that the second performance score indicates an improved performance compared to the first performance score.

6. The system of claim 4, wherein:
   the resource module further includes instructions that cause the one or more processors to record a history log of resource utilization for one or more of the vehicle members and to predict, based on the history log, upcoming availability of resources; and
   the instructions determine the change in formation position by generating the one or more potential formations comprise instructions to determine the change in formation position by generating the one or more potential formations based at least in part on a prediction of the upcoming availability resources.

7. The system of claim 4, wherein the instructions to determine the chage in formation position by generating the one or more potential formations comprise instructions to determine the change in formation position by generating the one or more potential formations by:
   obtaining contextual information that indicates characteristics of an environment in a vicinity of the vehicular micro cloud;
   identifying a designated situation based at least in part on the contextual information, the designated situation having an associated predetermined formation strategy; and
   generating at least one of the one or more potential formations in accordance with the predetermined formation strategy.

8. A method for controlling a vehicular micro cloud including a plurality of vehicle members each having respective positions in a formation, and in which two or more of the vehicle members collaboratively execute at least one micro cloud operation, comprising:
   monitoring performance of the at least one micro cloud operation;
   monitoring operational capabilities of the vehicle members;
   determining, based at least in part on the operational capabilities of the vehicle members, a change in formation position for at least one of the vehicle members, wherein the change in formation position improves the performance of the at least one micro cloud operation; and
   transmitting one or more commands to cause the vehicle members to execute the change in formation position.

9. The method of claim 8, wherein the at least one micro cloud operation includes one of more of:
   environmental scanning and/or object detection,
   performing a shared computational task among multiple ones of the vehicle members,
   storing or updating data contents among the multiple ones of the vehicle members, or
   transmitting data between an external system and the multiple ones of the vehicle members.

10. The method of claim 8, wherein the operational capabilities include one or more of:
   data storage capacity,
   computational power,
   sensor capability,
   network communication capability, or
   available applications.

11. The method of claim 8, wherein the determining the change in formation position comprises:
   generating one or more potential formations;
   determining that a new formation, from among the one or more potential formations, improves the performance of the at least one micro cloud operation; and
   determining the change in formation position according to the new formation.

12. The method of claim 11, wherein the determining that the new formation, from the one or more potential formations, improves the performance of the at least one micro cloud operation comprises:
   determining a first performance score for the at least one micro cloud operation in a current formation;
   simulating an execution of the at least one micro cloud operation in the new formation;
   determining a second performance score for the at least one micro cloud operation based on the execution; and
   determining that the second performance score indicates an improved performance compared to the first performance score.

13. The method of claim wherein:
   the monitoring the operational capabilities of the vehicle members comprises:
      recording a history log of resource utilization for one or more of the vehicle members, and
      predicting, based on the history log, upcoming availability of resources; and
   the generating the one or more potential formations comprises generating the one or more potential formations based at least in part on a prediction of the upcoming availability of resources.

14. The method of claim 11, wherein the generating the one or more potential formations comprises:
   obtaining contextual information that indicates characteristics of an environment in a vicinity of the vehicular micro cloud;
   identifying a designated situation based at least in part on the contextual information, the designated situation having an associated predetermined formation strategy; and
   generating at least one of the one or more potential formations in accordance with the predetermined formation strategy.

15. A non-transitory computer-readable medium for controlling a vehicular micro cloud including a plurality of vehicle members each having respective positions in a formation, and in which two or more of the vehicle members collaboratively execute at least one micro cloud operation, including instructions that, when executed by one or more processors, cause the one or more processors to:
   monitor performance of the at least one micro cloud operation;
   monitor operational capabilities of the vehicle members;
   determine, based at least in part on the operational capabilities of the vehicle members, a change in formation position for at least one of the vehicle members, wherein the change in formation position improves the performance of the at least one micro cloud operation; and transmit one or more commands to cause the vehicle members to execute the change in formation position.

16. The non-transitory computer-readable medium of claim 15, wherein the at least one micro cloud operation includes one of more of:

environmental scanning and/or object detection, performing a shared computational task among multiple ones of the vehicle members, storing or updating data contents among the multiple ones of the vehicle members, or transmitting data between an external system and the multiple ones of the vehicle members.

17. The non-transitory computer-readable medium of claim 15, wherein the operational capabilities include one or more of:

data storage capacity, computational power, sensor capability, network communication capability, or available applications.

18. The non-transitory computer-readable medium of claim 15, wherein the instructions to determine the change in formation position comprise instructions to:

generate one or more potential formations;

determine that a new formation, from among the one or more potential formations, improves the performance of the at least one micro cloud operation; and determine the change in formation position according to the new formation.

19. The non-transitory computer-readable medium of claim 18, wherein the instructions to determine that the new formation, from the one or more potential formations, improves the performance of the at least one micro cloud operation comprise instructions to:

determine a first performance score for the at least one micro cloud operation in a current formation;

simulate an execution of the at least one micro cloud operation in the new formation;

determine a second performance score for the at least one micro cloud operation based on the execution; and determine that the second performance score indicates an improved performance compared to the first performance score.

20. The non-transitory computer-readable medium of claim 18, wherein:

the instructions to monitor the operational capabilities of the vehicle members comprise instructions to:

record a history log of resource utilization for one or more of the vehicle members, and predict, based on the history log, upcoming availability of resources; and the instructions to generate the one or more potential formations comprise instructions to generate the one or more potential formations based at least in part on a prediction of the upcoming availability of resources.

* * * * *

UNITED STATES PATENT AND TRADEMARK OFFICE
CERTIFICATE OF CORRECTION

PATENT NO. : 11,323,858 B2
APPLICATION NO. : 16/823821
DATED : May 3, 2022
INVENTOR(S) : Seyhan Ucar, Takamasa Higuchi and Onur Altintas It is certified that error appears in the above-identified patent and that said Letters Patent is hereby corrected as shown below:

In the Claims

Claim 6, Line 12: "availability resources" should be "availability of resources".

Claim 13, Line 1: "claim wherein:" should be "claim 11, wherein:".

Signed and Sealed this
Twelfth Day of July, 2022

*Katherine Kelly Vidal*

Katherine Kelly Vidal
*Director of the United States Patent and Trademark Office*